United States Patent
Chen et al.

(10) Patent No.: US 11,233,985 B2
(45) Date of Patent: Jan. 25, 2022

(54) METHOD FOR VIDEO QUALITY DETECTION AND IMAGE PROCESSING CIRCUIT USING THE SAME

(71) Applicant: REALTEK SEMICONDUCTOR CORP., Hsinchu (TW)

(72) Inventors: Cheng-Yueh Chen, Hsinchu (TW); Ju-Wen Tseng, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/889,439

(22) Filed: Jun. 1, 2020

(65) Prior Publication Data
US 2020/0396440 A1  Dec. 17, 2020

(30) Foreign Application Priority Data

Jun. 13, 2019  (TW) ................................. 108120477

(51) Int. Cl.
| | | |
|---|---|---|
| H04N 17/00 | (2006.01) | |
| G06T 7/00 | (2017.01) | |
| G06T 5/40 | (2006.01) | |
| H04N 7/015 | (2006.01) | |
| G06T 5/50 | (2006.01) | |

(52) U.S. Cl.
CPC .............. *H04N 17/00* (2013.01); *G06T 5/40* (2013.01); *G06T 5/50* (2013.01); *G06T 7/0002* (2013.01); *H04N 7/015* (2013.01); *G06T 2207/10016* (2013.01); *G06T 2207/30168* (2013.01)

(58) Field of Classification Search
CPC .. H04N 17/00; H04N 7/015; H04N 21/44008; H04N 21/4854; H04N 17/004; G06T 5/40; G06T 5/50; G06T 7/0002; G06T 2207/10016; G06T 2207/30168
USPC ........................................................ 348/607
See application file for complete search history.

(56) References Cited

U.S. PATENT DOCUMENTS

| | | | | |
|---|---|---|---|---|
| 6,879,731 | B2 * | 4/2005 | Kang ..................... | H04N 5/235 382/274 |
| 2011/0019096 | A1 * | 1/2011 | Lee ........................ | H04N 9/646 348/607 |
| 2012/0076361 | A1 * | 3/2012 | Fujiyoshi ........... | G06K 9/00369 382/103 |

(Continued)

FOREIGN PATENT DOCUMENTS

| | | |
|---|---|---|
| CN | 102801938 A | 11/2012 |
| CN | 105453565 A | 3/2016 |

*Primary Examiner* — Michael Lee
(74) *Attorney, Agent, or Firm* — Li & Cai Intellectual Property (USA) Office (57) ABSTRACT

A method for video quality detection and an image processing circuit thereof are provided. In the method, an image-processing circuit receives video signals with at least one frame image, and obtains brightness information of pixels from the frame image. A threshold is applied to the pixels of each frame in order to screen the brightness features that can be regarded as an attribute of each frame image. Therefore, a brightness distribution feature with respect to the pixels of each frame image can be obtained by a statistic method. Statistics showing the brightness distribution can be used to determine a quality of each frame image or a video. The image processing circuit can accordingly select an image processing process corresponding to the image quality of each frame image or the whole video.

20 Claims, 10 Drawing Sheets

(56) References Cited

U.S. PATENT DOCUMENTS

2016/0088295 A1  3/2016 Yoshino et al.
2016/0317018 A1* 11/2016 Sakagawa ............ A61B 3/0058
2019/0094542 A1* 3/2019 Langner ................. G06F 3/013

* cited by examiner

METHOD FOR VIDEO QUALITY DETECTION AND IMAGE PROCESSING CIRCUIT USING THE SAME

CROSS-REFERENCE TO RELATED PATENT APPLICATION

This application claims the benefit of priority to Taiwan Patent Application No. 108120477, filed on Jun. 13, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to a method for detecting video quality, and more particularly to a display device that performs a method to use video signals statistics to detect video quality and an image-processing circuit thereof.

BACKGROUND OF THE DISCLOSURE

In the conventional image-processing technology performed in a display, a processing circuit of the display can obtain information such as display resolution and other information relating to a video when the video is inputted to the display. The information can be referred to when selecting a corresponding process for the video. For example, when receiving a high-definition video, a follow-up process performs an image-processing procedure (e.g., image sharpness) with the parameters corresponding to signals of the high-definition video. On the other hand, when receiving a low-definition video, the image-processing procedure applies the parameters corresponding to signals of the low-definition video.

In general, a standard video information record allows the processing circuit of the display to acquire a video resolution. For example, a Vender-Specific Info Frame (VSIF) or information in other specific formats such as HDMI Info Frame denotes a video quality. Therefore, the processing circuit of the display performs the image processing based on information of the video quality. However, information such as the resolution of the video may be altered by a specific device or a processing procedure while the video is transferred. For example, a resolution of a video may suffer impairment if the video is decompressed through a set top box, or a size and the resolution of the video may be changed if the video is transmitted via a network device over a network. Therefore, the process for transferring the video may affect the video and result in inconsistency between the original video information and the actual video information. The inconsistency may result in wrong information. Further, the wrong information may result in an erroneous image-processing that distorts, degrades, or causes subsequent side effects on the follow-up image processing of the video.

For example, a display such as a television receives video signals in a specific format (e.g., HDMI) via a signaling connection. Information of a video (e.g. VSIF) indicates that this is a high-definition (HD) video, while in fact the video is merely a standard-definition (SD) video. No matter what the actual resolution of the video is, a processing circuit of the television processes the video signals as a high-definition video since the circuit regards the video as a high-definition video according to the video information. Therefore, the video will be scaled up to a high-definition video. However, the related algorithm may be wrong when it uses wrong parameters that are inconsistent with the original resolution of the video if the video is improperly scaled up.

On the other hand, if the video is a standard-definition video, noise in the video signals may be magnified if the processing circuit processes the video with high-definition parameters. Therefore, further imaging may be a problem due to wrong resolution information. On the contrary, using low-definition image parameters to process a high-definition video would have no effect. For example, image sharpening in an image processing procedure is used for improving image sharpness, and an appropriate sharpening process specified to the resolution of a video should be used. Nevertheless, if information of a video is wrong, a low-definition video may be processed with high-definition image parameters, and the noise in the low-definition video will be magnified.

SUMMARY OF THE DISCLOSURE

In view of the drawbacks of an image processing process due to wrong video information carried by a video inputted to a display device, a method for video quality detection and an image-processing circuit applied in a display device are provided. In the method, brightness information of pixels in a frame image of a video is used for determining frame resolution of the video. The video quality can be determined based on the statistical brightness features of the video.

According to one embodiment of the disclosure, the method for video quality detection is adapted to an image-processing circuit. Essential steps of the method include, the image-processing circuit receives video signals that include at least one frame image, and brightness information of pixels in the at least one frame image can be obtained. Brightness features can be obtained from the at least one frame image according to a threshold, and the brightness features are regarded as an attribute of the at least one frame image. By a statistical method, a brightness variation distribution of the pixels in each frame image can be obtained, and the brightness variation distribution is used to determine the quality of the each frame image and the video signals.

The image-processing circuit applies processing parameters corresponding to the quality of each frame image to each of the frame images. Furthermore, if the signals of the video inputted include various qualities of frame images, the image-processing circuit adopts the processing parameters corresponding to the quality of each frame image to each of the frame images dynamically while processing the video signals.

In one embodiment, a threshold designated in the method for video quality detection is a gradient threshold that is used to determine the brightness features being regarded as an attribute with respect to the at least one frame image, and also to obtain a portion with larger brightness variation within the at least one frame image. In the step of obtaining the brightness distribution of pixels in each frame image by a statistical method, multiple pixel distances indicate various degrees of brightness variations that are used to establish a statistical histogram. The statistical histogram indicates a quantity distribution of the multiple pixel distances obtained from the frame images by comparing with a gradient threshold. The statistical histogram is used to determine whether or not the at least one frame image is considered as a frequently-changed image. For example, when the at least one frame image is determined as a frequently-changed image by the statistical histogram, the at least one frame image is considered as a high-definition image; when the at least one frame image is determined as a less-changed image by the statistical histogram, the at least one frame image is considered as a low-definition image.

In one further embodiment, the threshold is a plurality of brightness filters used in the image-processing circuit. The brightness filters are used to filter out the brightness feature that can be regarded as an attribute with respect to each of the frame images. Next, the brightness filters are used to reveal different degrees of the brightness variations of each of the frame images. A statistical histogram is accordingly established and is used to show a quantity distribution of the frame image at the brightness filtering levels.

According to the statistical histogram, if the quantity distribution of pixels in the at least one frame image tends toward higher levels of brightness filters, it is determined that the at least one frame image is considered as a high-definition image; if the quantity distribution of pixels in the at least one frame image tends toward lower levels of brightness filters, it is determined that the at least one frame image is considered as a low-definition image.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

A video can be downloaded via a network by a computer device and transmitted to a display device for playback. The video can also be obtained from a media-on-demand (MOD) technology from a specific platform. The video can be downloaded to a computer device via a network. While playing the video, the display device generally performs an image processing process on the video according to information carried by the video. However, the video information (e.g., a resolution of the video) may be changed by a specific device or a processing procedure while the video is transferred. For example, the resolution of the video may be damaged through a decompression procedure by a device (e.g., set top box). A size and the resolution of the video can also be changed while the video is transmitted via a network device over the network. These conversion procedures may affect the video and cause the original video information to be inconsistent with the actual video.

According to one of the objectives of a method for video quality detection and the image-processing circuit thereof, the method is able to detect a size of an original image inputted to the display device, and therefore is able to provide correct processing parameters for performing a follow-up image-processing process. The correct processing parameters can avoid improper image processing due to wrong video information. The improper image processing procedure may result in invalid processing or seriously distorting the video.

The method for video quality detection is able to provide the video quality instantly. The instant video quality represents correct video information that can avoid improper processing due to wrong video information. Furthermore, since the method for video quality detection of the disclosure can obtain video information by detecting the video frame-by-frame, the method allows the image-processing circuit to apply correct processing parameters specified to the frames even if the video includes frames that have various properties (e.g. resolution). Therefore, the video can be processed more correctly and comprehensively.

Figure 1:
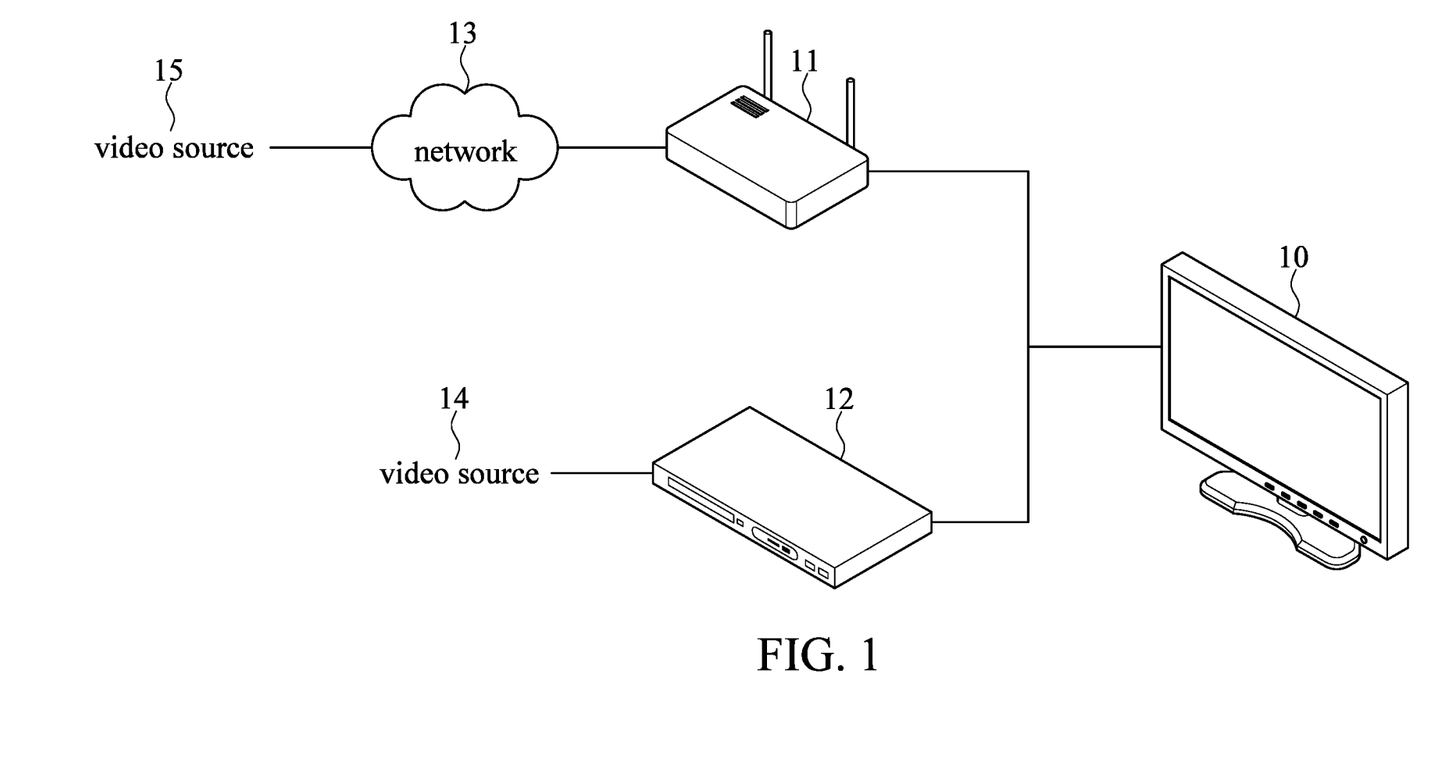
FIG. 1 is a schematic diagram showing a circumstance implementing a method for video quality detection according to one embodiment of the disclosure.

A system applying the method for video quality detection can be referred to in a schematic diagram shown in FIG. 1. A display device 10 such as a television, a display, a mobile device or a projector is shown. The display device 10 receives video signals by various methods. For example, the display device 10 connects to a network 13 via a network device 11 and obtains the video signals from a first video source 15 by a streaming or downloading method. Or alternatively, the display device 10 connects with a video player 12 via a signaling connection. The video player 12 can be a DVD or Blue-Ray Disc player, a Set-Top Box, or an MOD device that is used to process the content transmitted from a second video source 14 and then displayed on the display device 10.

Figure 2:
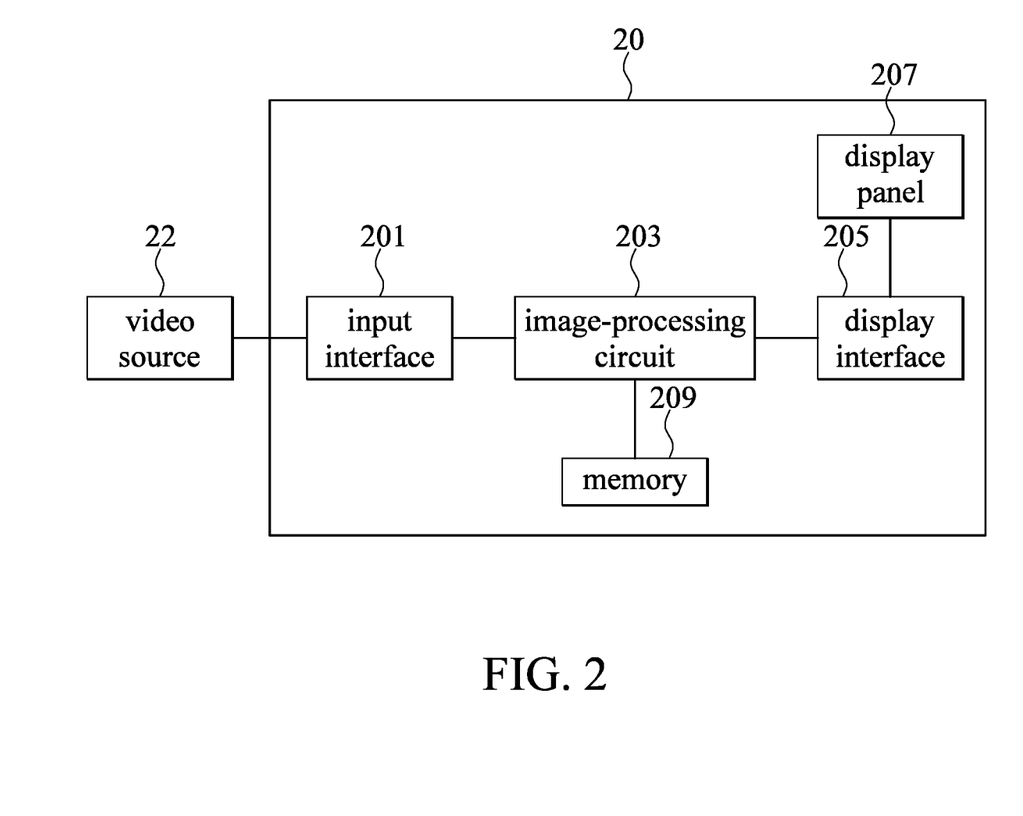
FIG. 2 is a schematic diagram depicting a system the performs the method for video quality detection according to one embodiment of the disclosure.

The method for video quality detection is performed in an image-processing circuit of the display device 10. Reference is made to FIG. 2, which is a schematic diagram depicting a system that performs the method for video quality detection according to one embodiment of the disclosure.

A display device 20 shown in FIG. 2 has an image-processing circuit 203 that is used to process the video signals in compliance with a specific format received from a video source 22 via an input interface 201. The image-processing circuit 203 selects a proper image processing procedure and processing parameters to process the video signals and then displays the content on a display panel 207 via a display interface 205.

The image-processing circuit 203 can be an integrated circuit (IC) or a circuit system that is used for processing the video signals. In an exemplary example, the image-processing circuit 203 uses proper processing parameters in accordance with the video quality to perform an appropriate image-processing procedure (e.g., image sharpness, noise reduction or color space transformation). The processing parameters can be stored to a memory 209 of the display device 20. A video resolution is as an example of the video quality, but it is not limited in the present disclosure.

When a video is inputted to the display device 20, the image-processing circuit 203 of the display device 20 provides high-definition processing parameters for a high-definition video or low-definition processing parameters for a low-definition video, and therefore performs correct image-processing procedure. For example, in an image sharpness procedure, proper sharpness weighting parameters are applied to signals of a video. In detail, if an image algorithm performed in the image-processing procedure is for improving image sharpness, a sharpness processing procedure should be performed upon the video resolution. The sharpness processing procedure should apply the appropriate sharpness weighting parameters. On the contrary, if video information is wrong, for example, the noise of low-definition video may be enhanced when the high-definition image algorithm is used to process the actual low-definition video.

In the method for video quality detection according to one embodiment of the disclosure, video signals with at least one frame are received by the image-processing circuit. Brightness information can be retrieved from pixels of a frame image. Brightness features extracted by a threshold can be used as an attribute of the at least one frame image. A brightness distribution of the pixels of the at least one frame image can be obtained by a statistical method. For example, a statistical histogram of the brightness of a plurality of pixels can be used to determine if a frame image is considered as a high-definition video or a low-definition video. An image-processing circuit can apply processing parameters corresponding to each of the frame images to the frame images. It should be noted that it may not be easy to determine quality of a video from frame-based video signals because a video includes a plurality of frame images, but the attribute with respect to the video having two or more frame images can be obtained by a comprehensive determination. For example, an average of features calculated from thirty frame images can be used as the attribute of the video. The proper processing parameters can be applied to the video according to the comprehensive determination of the video quality.

First Embodiment

With a frame with M×N (M being rows, N being columns) pixels in a video as an example, a brightness value can be obtained according to brightness or luminance of a pixel in a specific chromatic space, or a brightness value can be calculated according to red, green and blue values of the pixel.

Figure 3:
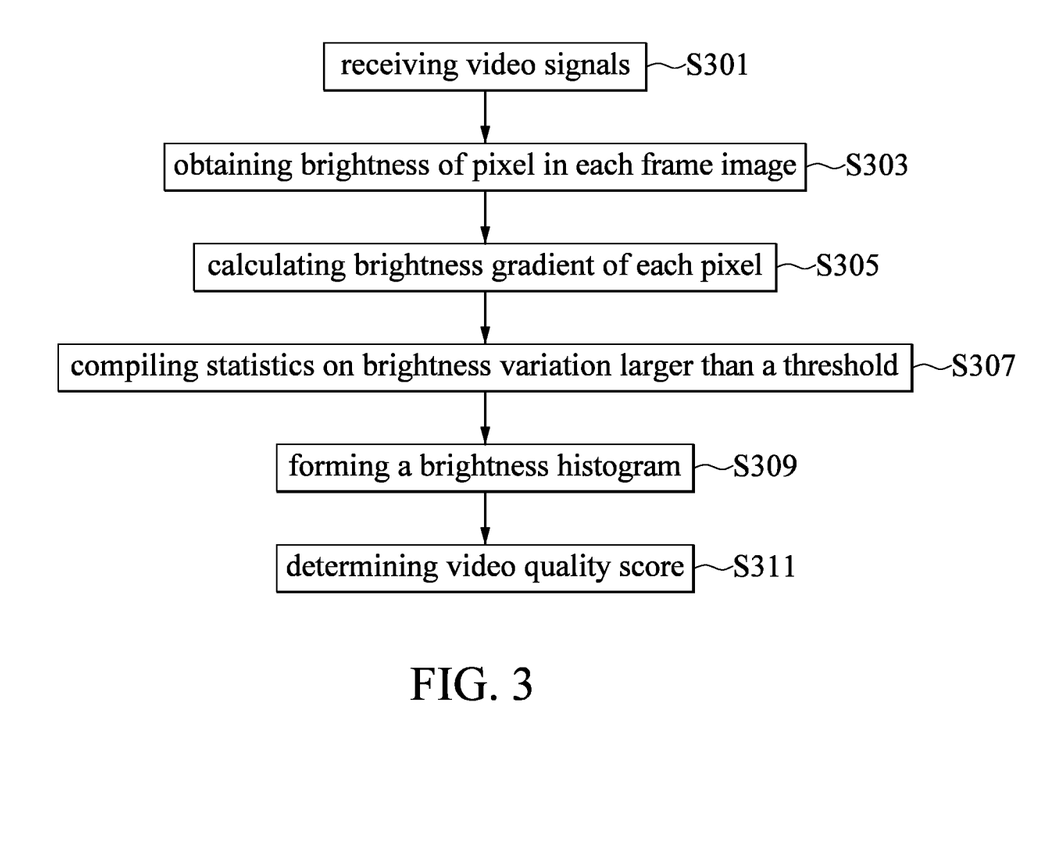
FIG. 3 shows a flow chart describing the method for video quality detection in one embodiment of the disclosure.

An image-processing circuit provides a buffer for temporarily storing image signals that are to be processed. The buffer can be a line buffer or a frame buffer. A size of the buffer affects the capability of the image-processing circuit to process images. Reference can be made to FIG. 3, which shows a flow chart describing a method for video quality detection in one embodiment of the disclosure.

In the present embodiment, in step S301, video signals are obtained from a video source, and the video signals can be processed in units of frames. Value of each of the pixels is firstly buffered in the buffer. In step S303, the brightness of each of the pixels is calculated when the image-processing circuit retrieves the signals from the buffer. A brightness variation between adjacent pixels (e.g., upper and lower pixels or left and right pixels) can be calculated. In step S305, a brightness gradient between the pixels can be obtained. The brightness gradient is used to determine features of the brightness variation according to an aspect of the method. The brightness can then be counted by a statistical method. The system, i.e., the image-processing circuit, may firstly set up a gradient threshold that is used to determine the brightness features being regarded as an attribute of the at least one frame image. In step S307, the method for obtaining the brightness gradient is to count the number of larger brightness variations (i.e., being larger than a threshold) in the at least one frame image. When comparing the brightness gradient with a gradient threshold, in step S309, a brightness variation statistical histogram can be established. By this statistical histogram, an attribute with respect to the current frame image can be determined. The attribute may indicate whether the frame image is a frequency-changed image or a less-changed image. If the statistics show that the variation of the frame image tends toward a frequently-changed image, it is determined that the frame is considered as a high-definition image; on the contrary, if the variation of the frame image tends toward a less-changed image, the frame is considered as a low-definition image. In step S309, statistical values in the statistical histogram can be used to create an equation for calculating the weighs. The calculation result of the equation can be used to determine the attribute of the frame image (i.e., the frequently-changed or less-changed image). In step S311, a quality score is given according to a corresponding table set up by the system, and the quality score can be used as a reference for the image-processing circuit to select an appropriate image-processing procedure and related processing parameters.

Figure 4:
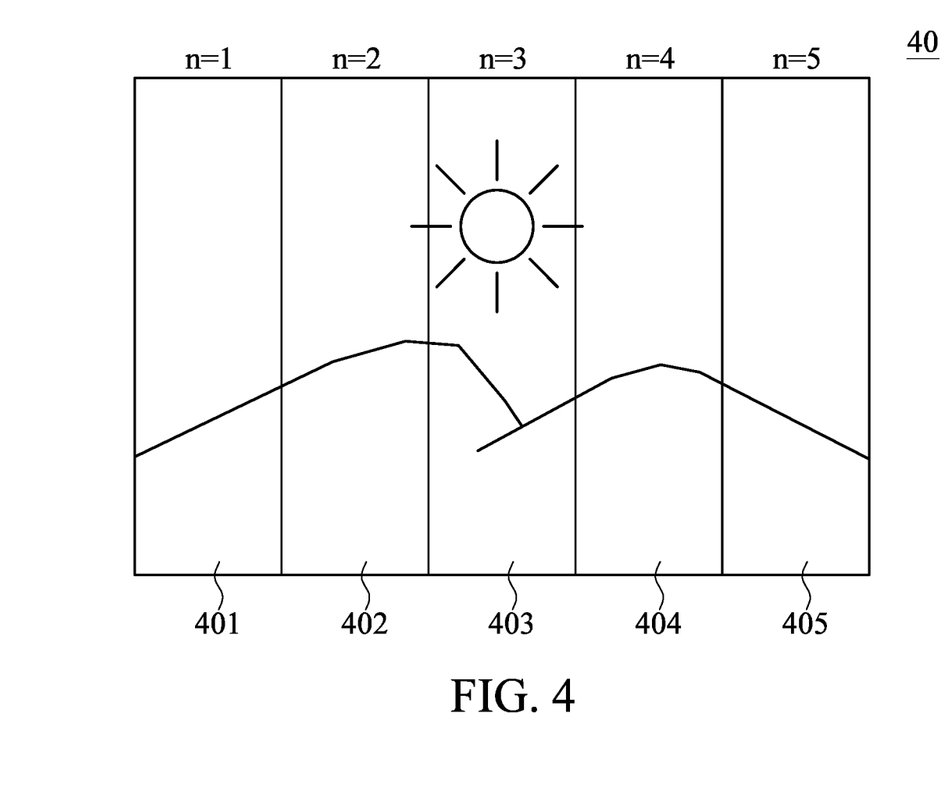
FIG. 4 is a schematic diagram showing multiple zones divided in the method for video quality detection in one embodiment of the disclosure.

When the image-processing circuit performs the method for video quality detection as FIG. 4 shows, a frame image 40 is divided into multiple zones (e.g., a first zone 401, a second zone 402, a third zone 403, a fourth zone 404 and a fifth zone 405). The image-processing procedure can be performed for each zone.

A brightness value of the pixel can be obtained by calculating brightness in each zone. The brightness variation between adjacent pixels can be used to obtain the brightness gradient. A portion with larger variation in the image can be obtained by comparing with the gradient threshold. When integrating statistical data of zones 401, 402, 403, 404 and 405, a quality of the at least one frame image 40 can be determined.

Figure 5:
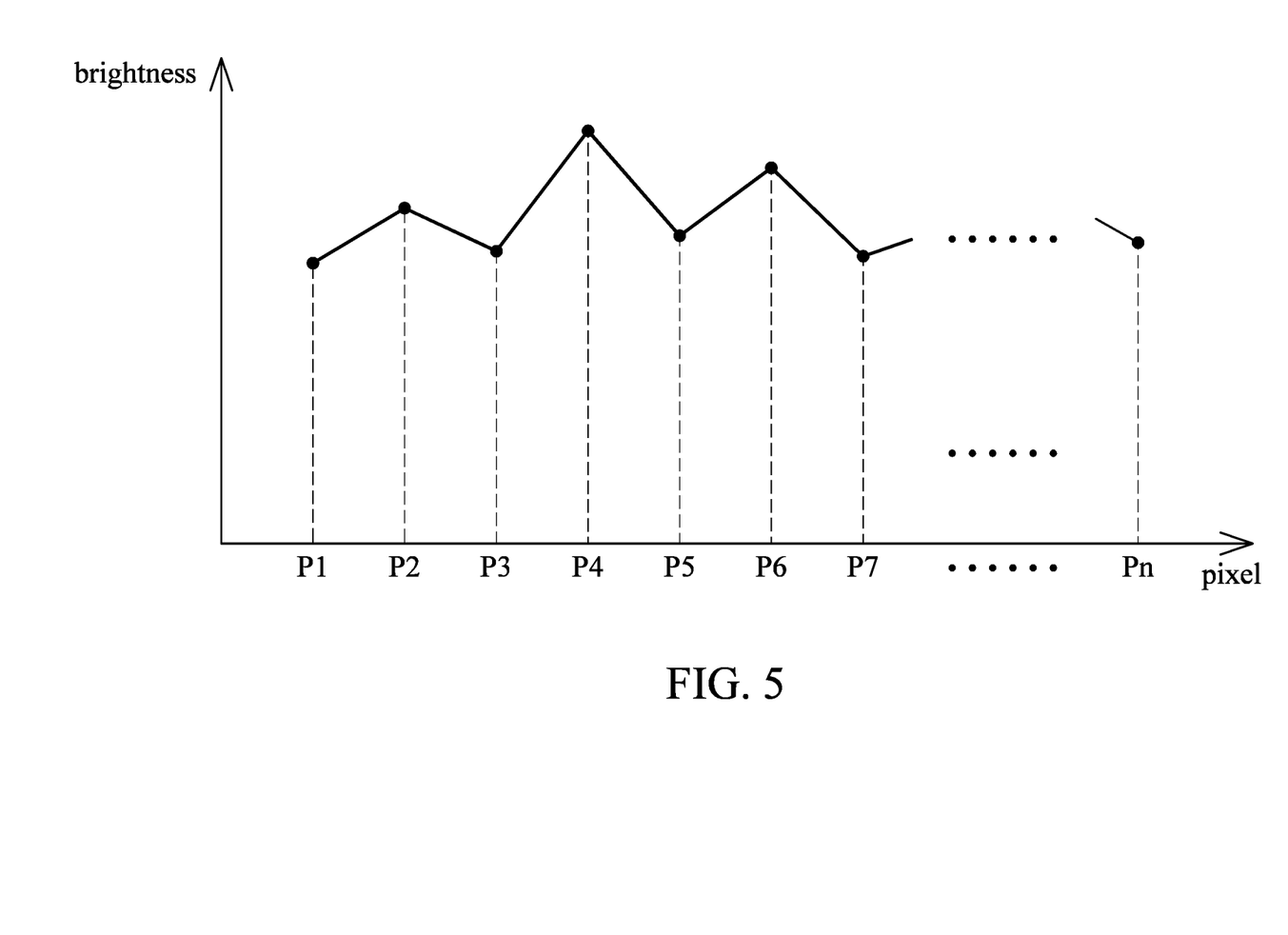
FIG. 5 is a schematic diagram showing statistics of pixel brightness variations in the method for video quality detection in one embodiment of the disclosure.

FIG. 5 is a curve graph showing continuous changes of the brightness of a sequence of pixels in a frame image. A vertical axis represents a brightness and a horizontal axis represents a number of pixels. The curve graph marks the brightness of the pixels (P1, P2, P3, P4, P5, P6, P7 . . . Pn) in the frame image. There is a brightness variation between every two adjacent pixels.

In FIG. 5, with one-dimensional pixels as an example, brightness with respect to pixels (P1, P2. . . Pn) can be obtained. The brightness gradient between every two pixels is compared with a gradient threshold. It indicates that the brightness has larger variation if the brightness gradient is larger than the gradient threshold. The brightness gradients that are larger than the gradient threshold are obtained. Number of the pixels between two of the brightness gradients larger than the gradient threshold are counted so as to compile statistics on the pixels of the whole frame. A brightness variation statistical histogram that stands for the quality of the frame is obtained.

When a brightness gradient matches or exceeds a gradient threshold, it indicates a change (i.e. turning in the histogram) occurring in the brightness of the image, and every change adds one to a count value and obtains a number of pixels during the brightness change. The horizontal axis of the statistical histogram is used to express the pixel distances d1, d2, d3, d4 and d5. In the step of obtaining brightness distribution of the pixels in the frame image, multiple pixel distances indicate different degrees of brightness variations, and a quantity distribution of the pixel distances of the at least one frame image can be obtained using the gradient threshold.

Figure 6:
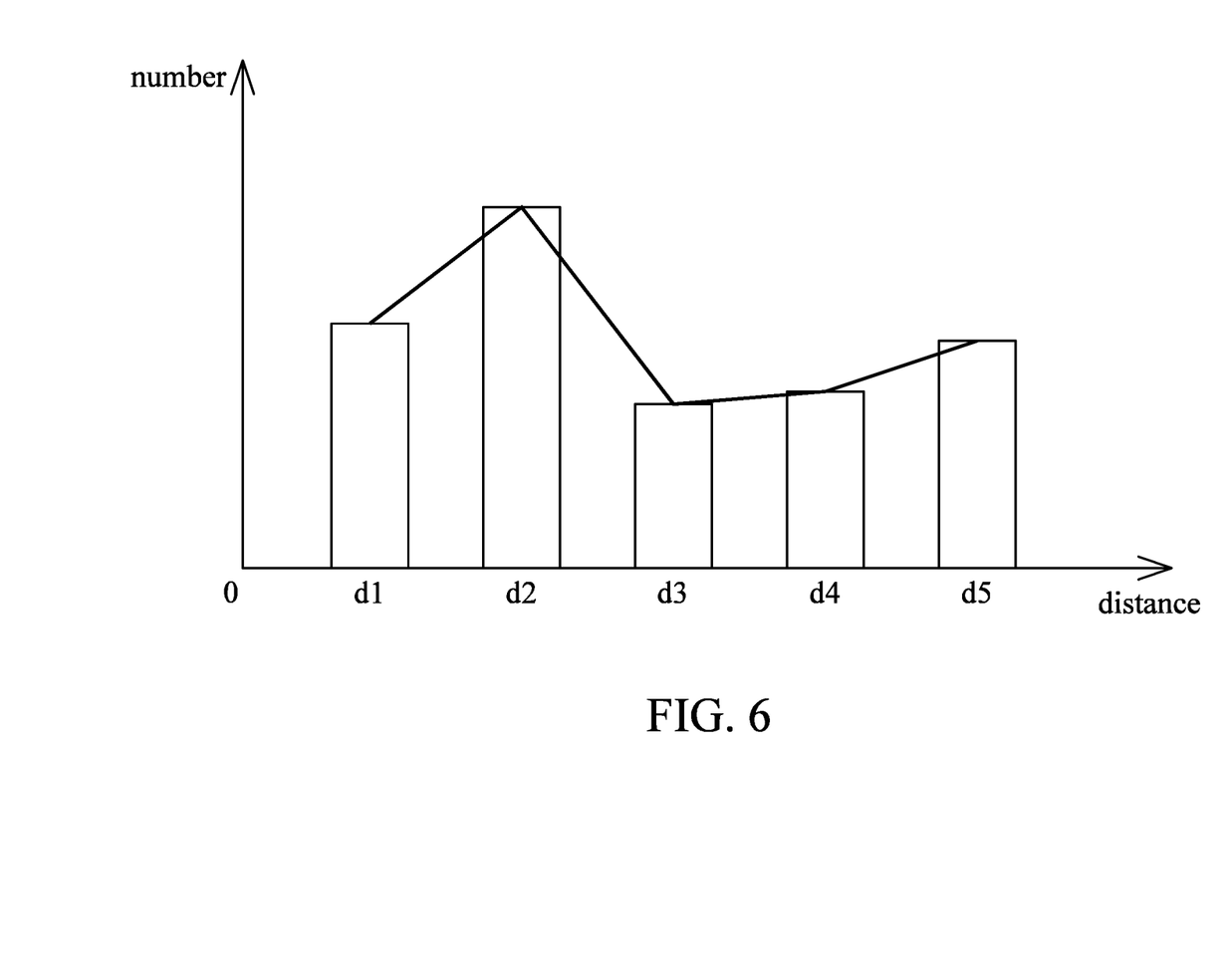
FIG. 6 is a schematic diagram showing a statistical histogram that is used to determine video quality in the method for video quality detection according to one embodiment of the disclosure.

FIG. 6 shows a statistical histogram that acts as a valuation of an attribute of an image. If the pixel distance is short, it denotes that there is a variation to be determined in a small amount of pixels; and if the pixel distance is long, it shows that the variation of the image is relatively gentle since every variation covers more pixels. In the method for video quality detection, the pixel distances can be referred to when determining the video resolution. When the frame pixels tend to the portion with short pixel distance by a statistical method, it shows that the image includes many details and the frame is considered as a high-definition image. On the contrary, when the frame pixels tend to the portion with long pixel distance, it otherwise shows that the image includes not much details and the frame is considered as a low-definition image. In addition to determining whether each of the frames is a high-definition image or a low-definition image, it also determines that the whole video is a high-definition video or a low-definition video. In a next step, the image-processing circuit can select appropriate processing parameters according to the video to perform a corresponding image-processing process.

For example, a number 'i' pixel is configured to be a starting pixel. The relations between the number 'i' pixel and its adjacent pixels allow the image-processing process to obtain brightness relationship between the number 'i' pixel and its upper, lower, left and right pixels. Therefore, a brightness gradient is formed. The brightness gradient indicates a variation that is compared with a gradient threshold. When the brightness gradient is larger than the gradient threshold, a turning point found at number 'j' pixel that is regarded as an ending pixel can be obtained. This aspect indicates that the method starts by comparing the brightness gradient from the number 'i' pixel, and adds one to a count value when a larger variation of brightness gradient is found at the number 'j' pixel. The number of turning points is calculated within the frame image. The statistical histogram shown in FIG. 6 is established.

FIG. 6 shows a schematic diagram using the statistical histogram to determine the video quality in the method according to one of the embodiments of the disclosure. The vertical axis of the histogram is a number of the count, and the horizontal axis is a distance that is defined as a pixel distance between the number 'i' pixel and the number 'j' pixel, i.e. j minus i equals to the pixel distance. By a statistical method, the pixels distances can be classified into several ranges of values such as the shown pixel distances d1, d2, d3, d4 and d5.

If the pixel distance d1 indicates a smaller distance, the pixel distance d5 indicates a larger distance. FIG. 6 is an exemplary example showing that a brightness distribution of the frame image tends toward a smaller pixel distance, i.e. most of the counts are close to the pixel distances d1 and d2. The frame image in this example has more details that cause the larger variation of the brightness gradient, and the method determines that the frame image is considered as a high-definition image. Lastly, a quality score can be given according to a comparison made by the image-processing circuit. It should be noted that the extreme values in the histogram can be deleted for statistical purposes, and a comprehensive determination with respect to the video quality can be made based on the quality scores of the rest of main portions of the histogram.

Second Embodiment

According to one of the embodiments of the method for video quality detection, a plurality of brightness filters are provided as the threshold for filtering out the brightness features that can be regarded as the attribute of the frame image. The filter can be a high pass filter that is configured to set up different brightness filtering parameters for each brightness filter. The brightness filtering parameters represent various brightness filtering levels. The brightness filters filter the brightness of pixels in the frame image for obtaining the brightness features that can be regarded as the attribute of the frame image.

Figure 7:
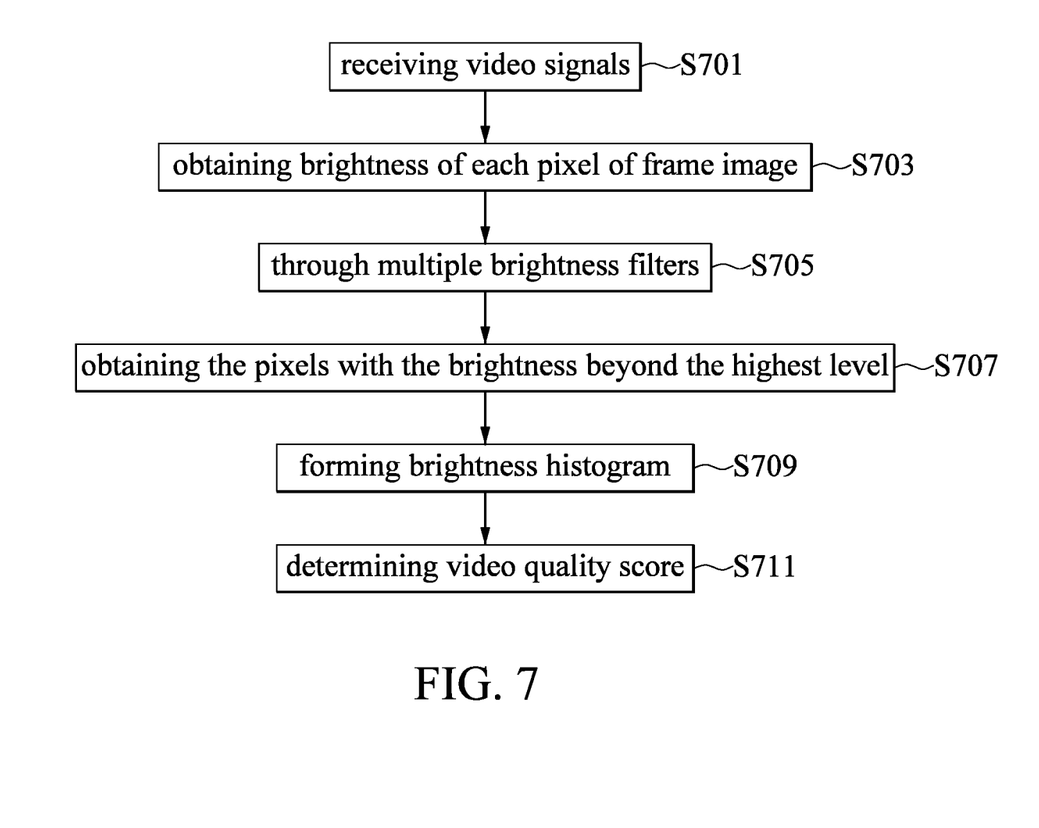
FIG. 7 shows a flow chart describing the method for video quality detection in one further embodiment of the disclosure.

FIG. 7 shows a flow chart describing the method for video quality detection in one embodiment of the disclosure. The image-processing circuit receives video signals (step S701), and brightness of pixels in the frame image can be obtained (step S703). The brightness of the pixels can be filtered by the brightness filters (step S705) for obtaining the brightness that can be regarded as the attribute with respect to the frame image. Every pixel may pass one or more brightness filters and the pixels with brightness beyond the highest level of the filters are counted (step S707) so as to form a brightness histogram (step S709). The brightness histogram shows a distribution of the pixels of each frame in the brightness filters. The quality of the frame image can therefore be determined and the video quality can also be determined (step S711).

In an exemplary example, there are N brightness filters: filter 0 to filter N−1. The brightness filters are used to filter out the brightness of pixels in the frame image by the flow described in FIG. 7. N combinations of weights of the current pixel and its adjacent pixel are calculated. A first brightness filter, i.e. filter 0, uses weights (coff0, coff1, coff(K−1)), and it is expressed as filter0: {filter0_coff0, filter0_coff1, . . . , filter0_coff(K−1)}. The brightness of pixel can be filtered by the first brightness filter. An Nth brightness filter, i.e. filter N−1, is expressed as filter(N−1): {filter(N−1)_coff0, filter(N−1)_coff1, . . . , filter(N−1)_coff (K−1)}. The variables N and K are positive integers. The statistical histogram is used to count the number of pixels of which brightness passes the N brightness filters, and a frequency mode of the whole image can be obtained.

The image-processing circuit uses the plurality of brightness filters to obtain a brightness distribution of pixels in the frame image. The plurality of brightness filters show the different degrees of brightness variations of each frame image. A statistical histogram is then established. The statistical histogram is used to show the quantity distribution of the number of pixels in the frame image at the brightness filtering levels. Therefore, a frequency mode tending toward high frequency, medium frequency or low frequency of the frame image can be obtained. In addition to determining the quality of frame image, the quality of video signals can also be determined.

For example, three brightness filters with three brightness filtering levels are provided. The filters with the filtering levels from high to low are expressed as a first brightness filter (filter 1), a second brightness filter (filter 2), and a third brightness filter (filter 3). When a first pixel P1 passes all the first brightness filter (filter 1), the second brightness filter (filter 2), and the third brightness filter (filter 3), a counter for the first brightness filter with the highest filtering level adds 1; when a second pixel P2 passes both the second brightness filter (filter 2) and the third brightness filter (filter 3), a counter for the second brightness filter with the filtering level higher than the third brightness filter adds 1; when a third pixel P3 only passes the third brightness filter (filter 3), a counter for this third brightness filter adds 1, and so on. A statistical histogram applied to the whole frame image is obtained and can be used to obtain the quantity distribution of pixels of the whole frame under the brightness filtering parameters.

In the present example, if the quantity distribution of pixels of the frame tends toward brightness filters with higher filtering level, the pixels with higher frequency and more details can be obtained. Therefore, the related frame image is considered as a high/higher-definition image. On the contrary, if the quantity distribution of pixels of the frame tends toward brightness filters with lower filtering level, the pixels with lower frequency and less detail are obtained. Therefore, the related frame image is considered as a low/lower-definition image. A statistical histogram with respect to the frame image is established, and a quality score is given. The quality score acts as a reference for the image-processing circuit to select an image-processing procedure and the related processing parameters. Furthermore, the quality of the video signals can be determined based on the quality of the frame images.

According to the above-described embodiments, the method for video quality detection can obtain a resolution range of the input video and the frame through a statistical histogram that is established based on the filtering process using the brightness gradient or the brightness filtering levels. The method uses the statistical method to detect the resolution of frame as a high-definition (e.g. Full HD) image, a medium-definition (e.g. HD) image or a low-definition (e.g. SD) image.

In the method, the image-processing circuit stores several sets of processing parameters in a memory, and the processing parameters correspond to a plurality of ranges of resolution so as to form a comparison table. The comparison table allows the procedure executed in the image-processing circuit to select the processing parameters with respect to the resolution range of the input video.

The method obtains the resolution range, e.g. Full HD, HD or SD, with respect to the input video and the frames thereof through the statistical histogram.

Figure 8:
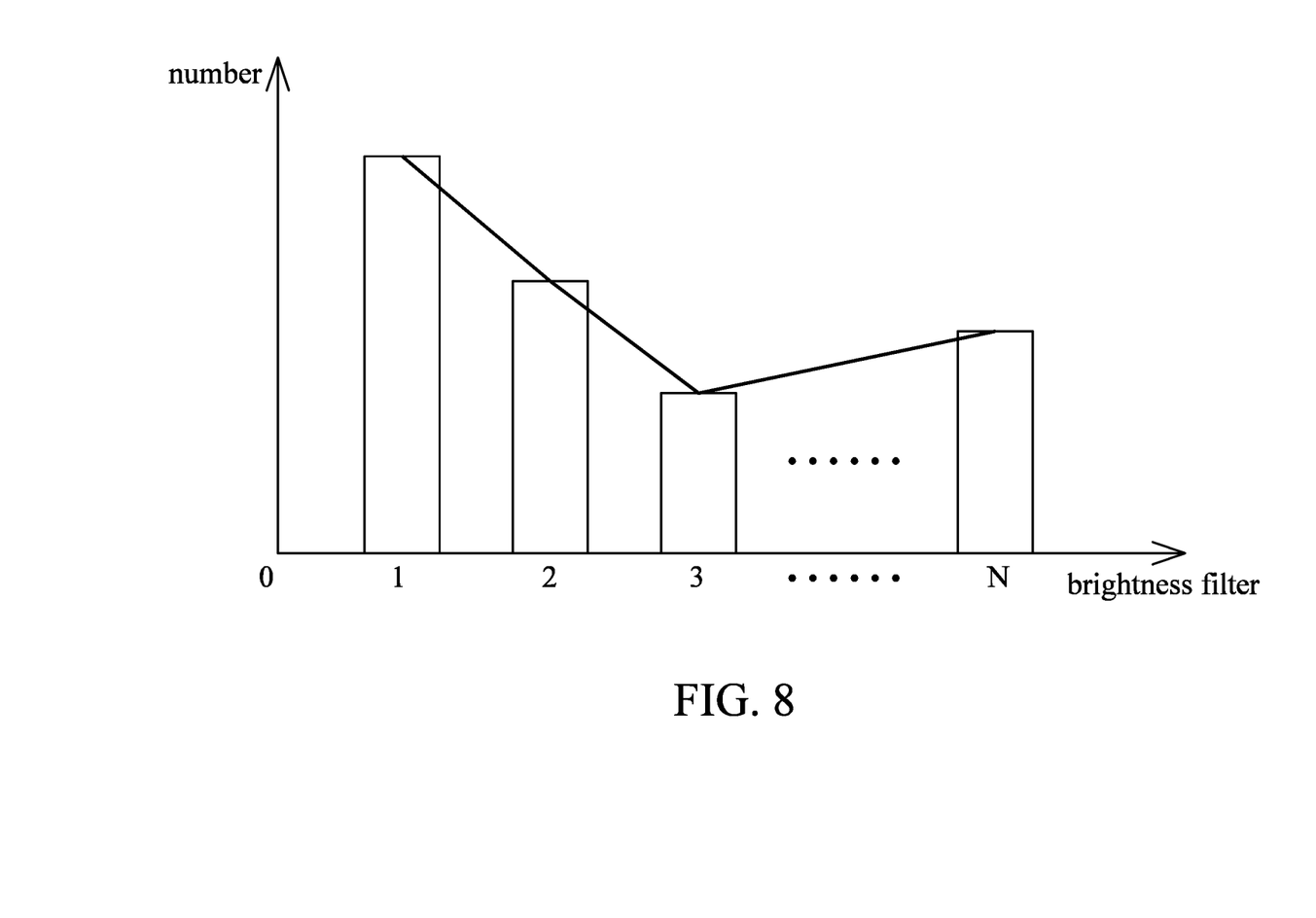
FIG. 8 and FIG. 9 show schematic diagrams of statistical histogram used for determining video quality in the method for video quality detection in one embodiment of the disclosure.
Figure 9:
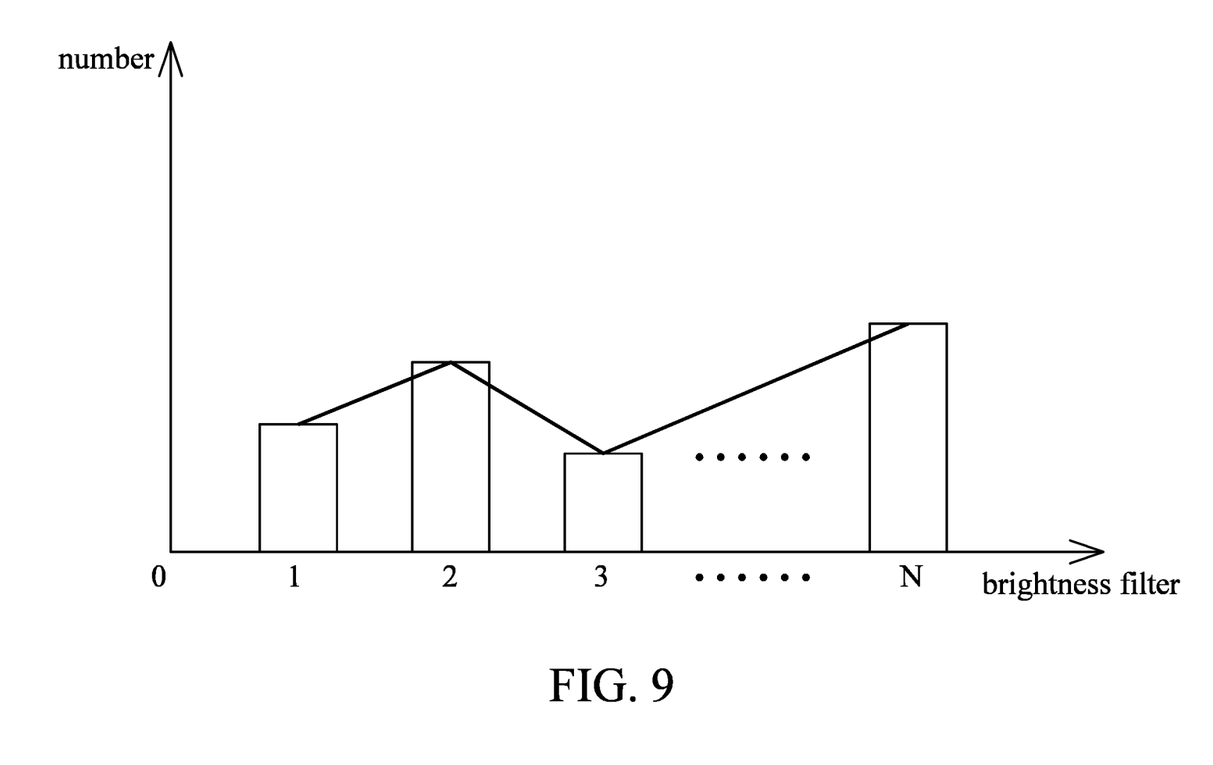

FIG. 8 shows an example for determining the video quality through a statistical histogram in the method of the disclosure. The horizontal axis indicates multiple brightness filters numbered with 1, 2, 3 . . . N. The vertical axis indicates a statistical number. The present example shows that the statistical number of the quantity distribution tends toward the brightness filters numbered with 1 and 2. It shows that the pixels of an image are distributed in the area with higher frequency. The higher frequency means the brightness variation of the image is larger. It also determines that the frame image is a high resolution image. On the contrary, as FIG. 9 shows, the statistical number of the quantity distribution tends toward the brightness filters with bigger numbers that indicate the distribution with lower frequency. The lower frequency means the less-changed brightness variation. It determines that the frame image is a lower resolution image.

Figure 10:
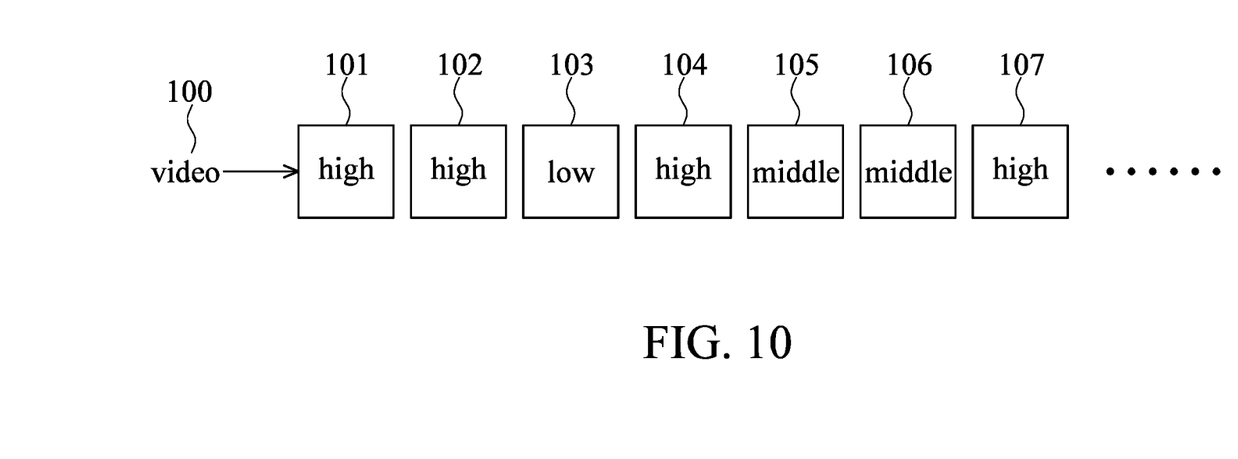
FIG. 10 is a schematic diagram showing a video with various resolutions applied in the method for video quality detection according to one embodiment of the disclosure.

FIG. 10 shows a circumstance in which one video may include different resolutions of images. In the method for video quality detection, when two or more different qualities of frame images in the video signals are detected, the image-processing circuit of the display device can dynamically process the frame images with corresponding processing parameters based on the detection result. In FIG. 10, a video 100 includes a plurality of frame images frame images 101, 102, 103, 104, 105, 106 and 107. The frame images are determined to have various image qualities including high resolution, medium resolution and low resolution by the method for video quality detection. The image-processing circuit can therefore process the frame images with the corresponding processing parameters dynamically.

According to the above-described first and second embodiments, the statistical histogram is especially utilized to determine the video quality. For example, in one aspect, the determined result obtained by the first or the second embodiment can be used for selecting an image-processing procedure or the processing parameters. In another aspect, both the determined results obtained by the first and the second embodiments are considered for determining the video quality. In one further aspect of the disclosure, a weighting operation may be performed upon the determined results obtained by both of the embodiments for making the final determination of the video quality in order to select a proper image-processing procedure or processing parameters.

The main technical aspect of the method for video quality detection is to process a brightness statistics on each of the frame images of an input video in order to obtain brightness distribution of every frame. A statistical histogram is then obtained, and can be used to determine a correct resolution of the input video. The correct resolution can avoid erroneous processes performed on the video signals based on wrong video information that is inconsistent with original video information (e.g., metadata and Vender-Specific Infor Frame (VSIF)), and that may be caused by other equipment or image processing processes. The wrong video information such as wrong resolution, video size, time and chromatic space that may lead to wrong determination and use of erroneous image-processing procedure.

In summation, the method for video quality detection of the disclosure uses the brightness information of the video to establish the statistical histogram for determining the video resolution. One of the objectives of the method is to provide a correct post-image-processing procedure for the input video. Further, the method also allows the image-processing circuit to perform the correct image-processing procedure by detecting the resolution of each frame of the video in real-time. More specifically, in an aspect, the method provides a solution for the circuit to perform more accurate image-processing procedures with respect to the magnified portion and unmagnified portion of the video, respectively.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for video quality detection, applied to an image-processing circuit, comprising:
   receiving video signals including at least one frame image;
   obtaining brightness information with respect to each pixel from pixel information of the at least one frame image;
   using a threshold to determine a brightness feature of the at least one frame image as an attribute with respect to the at least one frame image;
   obtaining a brightness distribution of pixels of the at least one frame image by a statistical method that establishes a statistical histogram based on different degrees of brightness variations in order to show a quantity distribution of multiple pixel distances obtained from the at least one frame image or another quantity distribution of the at least one frame image at a plurality of brightness filtering levels; and
   determining quality of the at least one frame image;
   wherein, when the pixels of the at least one frame tend to a portion with short pixel distance, the at least one frame is determined as a high-definition image; when the pixels of the at least one frame tend to a portion with long pixel distance, the at least one frame is determined as a low-definition image.

2. The method as recited in claim 1, wherein when the quality of the at least one frame image is determined, the image-processing circuit applies processing parameters corresponding to the quality to the at least one frame image.

3. The method as recited in claim 2, wherein the video signals include two or more frame images that are used for determining quality of the video signals, and the image-processing circuit applies processing parameters corresponding to the quality to the video signals.

4. The method as recited in claim 3, wherein, when the two or more frame images in the video signals have different qualities, the image-processing circuit applies processing parameters corresponding to the two or more frame images to the two or more frame images separately.

5. The method as recited in claim 1, wherein the threshold is a gradient threshold that is used to determine the brightness feature from the at least one frame image as an attribute with respect to the at least one frame image, and also obtain a portion with larger brightness variation within the at least one frame image.

6. The method as recited in claim 5, wherein, in the step of obtaining the brightness distribution of the at least one frame image, the multiple pixel distances are used to show the different degrees of brightness variations so as to establish the statistical histogram in order to indicate the quantity distribution of the multiple pixel distances obtained from the at least one frame image by the gradient threshold.

7. The method as recited in claim 6, wherein, when the at least one frame image is determined as a frequently-changed image by the statistical histogram, the at least one frame image is considered as the high-definition image; when the at least one frame image is determined as a less-changed image by the statistical histogram, the at least one frame image is considered as the low-definition image.

8. The method as recited in claim 7, wherein, according to the statistical histogram of the at least one frame image, a quality score is given to the at least one frame image as a reference for the image-processing circuit to select processing parameters.

9. The method as recited in claim 1, wherein the threshold is a plurality of brightness filters used in the image-processing circuit, and the plurality of brightness filters are used to obtain the brightness feature as an attribute with respect to the at least one frame image.

10. The method as recited in claim 9, wherein, in the step of obtaining the brightness distribution of pixels in the at least one frame image, the plurality of brightness filters are used to reveal the different degrees of brightness variations of the at least one frame image, so as to establish the statistical histogram in order to show the quantity distribution of the at least one frame image at the plurality of brightness filtering levels.

11. The method as recited in claim 10, wherein, according to the statistical histogram, if the quantity distribution of pixels in the at least one frame image tends toward higher levels of brightness filters, it is determined that the at least one frame image is considered as the high-definition image; if the quantity distribution of pixels in the at least one frame image tends toward lower levels of brightness filters, it is determined that the at least one frame image is considered as the low-definition image.

12. The method as recited in claim 11, wherein, according to the statistical histogram of the at least one frame image, a quality score is given to the at least one frame image as a reference for the image-processing circuit to select processing parameters.

13. An image-processing circuit performing a method for video quality detection comprising:
 receiving video signals via an input interface, wherein the video signals include at least one frame image;
 obtaining brightness information with respect to each pixel from pixel information of the at least one frame image;
 using a threshold to determine a brightness feature of the at least one frame image as an attribute with respect to the at least one frame image;
 obtaining a brightness distribution of pixels of the at least one frame image by a statistical method that establishes a statistical histogram based on different degrees of brightness variations in order to show a quantity distribution of multiple pixel distances obtained from the at least one frame image or another quantity distribution of the at least one frame image at a plurality of brightness filtering levels;
 determine quality of the at least one frame image and the quality acting as a reference for the image-processing circuit to select processing parameters, in which, when the pixels of the at least one frame tend to a portion with short pixel distance, the at least one frame is determined as a high-definition image; when the pixels of the at least one frame tend to a portion with long pixel distance, the at least one frame is determined as a low-definition image; and
 using the processing parameters to process the video signals by the image-processing circuit.

14. The image-processing circuit as recited in claim 13, wherein, when the video signals include two or more frame images with different qualities, the image-processing circuit applies processing parameters corresponding to the two or more frame images to the two or more frame images separately.

15. The image-processing circuit as recited in claim 13, wherein the threshold is a gradient threshold that is used to determine the brightness feature from the at least one frame image as an attribute with respect to the at least one frame image, and also obtain a portion with larger brightness variation within the at least one frame image.

16. The image-processing circuit as recited in claim 15, wherein, in the step of obtaining the brightness distribution of pixels of the at least one frame image by the statistical method, the multiple pixel distances are used to indicate the different degrees of brightness variations so as to establish the statistical histogram for showing the quantity distribution of the multiple pixel distances obtained from the at least one frame image using the gradient threshold.

17. The image-processing circuit as recited in claim 16, wherein, when the at least one frame image is determined as a frequently-changed image by the statistical histogram, the at least one frame image is considered as the high-definition image; when the at least one frame image is determined as a less-changed image by the statistical histogram, the at least one frame image is considered as the low-definition image.

18. The image-processing circuit as recited in claim 13, wherein the threshold is a plurality of brightness filters used in the image-processing circuit, and the plurality of brightness filter are used to obtain brightness feature as an attribute with respect to the at least one frame image.

19. The image-processing circuit as recited in claim 18, wherein, in the step of obtaining the brightness distribution of pixels in the at least one frame image, the plurality of brightness filters are used to reveal the different degrees of brightness variations of the at least one frame image, so as to establish the statistical histogram in order to show the quantity distribution of the at least one frame image at the plurality of brightness filtering levels.

20. The image-processing circuit as recited in claim 19, wherein, according to the statistical histogram, if the quantity distribution of pixels in the at least one frame image tends toward higher levels of brightness filters, it is determined that the at least one frame image is the high-definition image; if the quantity distribution of pixels in the at least one frame image tends toward lower levels of brightness filters, it is determined that the at least one frame image is the low-definition image.

\* \* \* \* \*